United States Patent
Lv

(10) Patent No.: US 12,308,742 B2
(45) Date of Patent: May 20, 2025

(54) CONTROLLER, SWITCHED-MODE POWER SUPPLY AND METHOD FOR CONTROLLING SWITCHED-MODE POWER SUPPLY

(71) Applicant: SHANGHAI BRIGHT POWER SEMICONDUCTOR CO., LTD., Shanghai (CN)

(72) Inventor: Danzhu Lv, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 259 days.

(21) Appl. No.: 18/084,690

(22) Filed: Dec. 20, 2022

(65) Prior Publication Data
US 2023/0208302 A1    Jun. 29, 2023

(30) Foreign Application Priority Data
Dec. 28, 2021   (CN) .......................... 202111630544.2

(51) Int. Cl.
*H02M 3/158*    (2006.01)
*H02M 1/08*     (2006.01)
(52) U.S. Cl.
CPC ............. *H02M 3/158* (2013.01); *H02M 1/08* (2013.01)

(58) Field of Classification Search
CPC ....... H02M 3/158; H02M 3/1566; H02M 1/08
See application file for complete search history.

(56) References Cited

U.S. PATENT DOCUMENTS

2013/0141069 A1\*  6/2013  Li ........................... G05F 1/575
                                                        323/283
2021/0099080 A1\*  4/2021  Chen ..................... H02M 3/155

FOREIGN PATENT DOCUMENTS

| CN | 102412707 A | 4/2012 |
|----|-------------|--------|
| CN | 108023468 A | 5/2018 |
| JP | 2007104741 A | 4/2007 |

\* cited by examiner

*Primary Examiner* — Harry R Behm
(74) *Attorney, Agent, or Firm* — MUNCY, GEISSLER, OLDS & LOWE, P.C.

(57) ABSTRACT

A controller in a switched-mode power supply and a method for control thereof are disclosed by the present invention. The controller provided in the present invention is used to control a power switching device in the switched-mode power supply to convert an input DC voltage into an output DC voltage. The controller includes a sampling and feedback unit and a ramp compensation unit and is configured to obtain a first ramp signal reflecting energy variation of an energy storage element and to produce a second ramp signal from the first ramp signal so that the difference between the second ramp signal and the first ramp signal is lower than a predetermined value.

13 Claims, 3 Drawing Sheets

CONTROLLER, SWITCHED-MODE POWER SUPPLY AND METHOD FOR CONTROLLING SWITCHED-MODE POWER SUPPLY

CROSS-REFERENCE TO RELATED APPLICATION

This application claims the priority of Chinese patent application number 202111630544.2, filed on Dec. 28, 2021, the entire contents of which are incorporated herein by reference.

TECHNICAL FIELD

The present invention relates to the field of electric power and, in particular, to a controller, a switched-mode power supply and a method for controlling a switched-mode power supply.

BACKGROUND

A switched-mode power supply can provide a constant output voltage within a certain load range. Switched-mode power supplies are structurally stable, efficient and diverse in control mode, so they have been widely used in high-power applications for voltage conversion. The constant on-time (COT) control mode is one of the most commonly used control modes in the field of switched-mode power supplies. This COT control mode has a simple loop, less reliance on peripheral devices which facilitates board-level integration, fast response and high efficiency under light load conditions.

For a switched-mode power supply operating in a COT control mode, its stability can be assessed according to ESR*Cout>Ton/2, where Cout represents the capacitance of an output capacitor, ESR represents equivalent series resistance of the output capacitor and Ton is an on-time. Obviously, the stability of the COT control mode largely depends on ESR, and larger ESR means higher stability of the switched-mode power supply. However, excessively large ESR would be problematic and limit the choice of the output capacitor. In practical applications, a ceramic capacitor with very lower ESR value is usually chosen as an output capacitor, and the low stability problem that it introduces must be dealt with otherwise. A common approach is to collect a current ripple signal from an inductor serving as an energy storage element in the switched-mode power supply, and to calculate its average, then adding a compensation voltage to a feedback loop, which is calculated as the difference of the signal and its average. However, this conventional method is problematic because, for example, in the event of the switched-mode power supply switching from a continuous conduction mode (CCM) to a discontinuous conduction mode (CCM), because of the calculation process, the average current signal is delayed with respect to the current ripple signal, therefore the calculated compensation voltage tends to have an amplitude greater than what is supposed to be and thus cause a variation of the output voltage. Consequently, the switched-mode power supply exhibits poor response performance during load switching.

SUMMARY OF THE INVENTION

The present invention provides a controller, a switched-mode power supply and a method for controlling a switched-mode power supply, in which a compensation voltage is produced in an improved manner, which enhances performance of the switched-mode power supply during instantaneous load jumps and allows an output capacitor with lower ESR to be suitably used in the switched-mode power supply.

In one aspect, the present invention provides a controller for a switched-mode power supply. The switched-mode power supply comprises at least one power switching element and an energy storage element. The at least one power switching element is switchable to feed an input DC voltage to the energy storage element. The controller comprises:

a sampling and feedback unit, configured to obtain a first ramp signal reflecting an energy variation of the energy storage element; and a ramp compensation unit, configured to receive the first ramp signal and to produce a second ramp signal, wherein the second ramp signal is produced based on the first ramp signal, wherein a difference between the second ramp signal and the first ramp signal is lower than a predetermined value, and wherein the controller controls operation of the at least one power switching element based on the difference between the first and second ramp signals.

Optionally, the sampling and feedback unit may comprise a resistor divider circuit and a filter circuit, wherein the resistor divider circuit is coupled to a first end of the energy storage element to obtain a voltage signal at the first end of the energy storage element, and wherein the voltage signal is transmitted through the filter circuit to produce the first ramp signal.

Optionally, the resistive divider circuit may comprise a first resistor and a second resistor that are connected in series, wherein the resistive divider circuit has a first end coupled to the energy storage element and a second end coupled to a ground, and wherein the filter circuit is coupled to a connection node of the first resistor and the second resistor.

Optionally, the ramp compensation unit may comprise:
a clamping circuit for producing the second ramp signal based on the first ramp signal, wherein in an event of the second ramp signal rising above the first ramp signal, the clamping circuit is configured to cause the second ramp signal to decrease to the first ramp signal.

Optionally, the clamping circuit may comprise:
an operational amplifier configured to receive the first ramp signal and the second ramp signal, and to output a drive signal; and
a first switch connected between the second ramp signal and a ground, wherein when the second ramp signal rises above the first ramp signal, the drive signal drives the first switch to turn on to cause the second ramp signal to decrease, and when the second ramp signal drops to the first ramp signal, the drive signal drives the first switch to turn off to cause the second ramp signal to stop decreasing.

Optionally, the ramp compensation unit may comprise:
a sample-and-hold circuit configured to produce a sampled-and-held signal based on the first ramp signal, wherein the sampled-and-held signal follows the minimum value of the first ramp signal to vary; and
a selection circuit configured to receive and compare the sampled-and-held signal that has been filtered and the first ramp signal, wherein when the sampled-and-held signal is higher than the first ramp signal, the selection circuit causes the second ramp signal to become equal to the first ramp signal, and when the sampled-and-held signal is not higher than the first ramp signal, the selection circuit causes the second ramp signal to become equal to the sampled-and-held signal.

Optionally, the selection circuit may comprise:
a comparator configured to receive the sampled-and-held signal that has been filtered and the first ramp signal, and to output a control signal; and
a second switch connected between the first and second ramp signals,
wherein when the sampled-and-held signal is higher than the first ramp signal, the control signal controls the second switch to turn on to cause the second ramp signal to become equal to the first ramp signal.

In another aspect, the present invention provides a switched-mode power supply comprising at least one power switching element, an energy storage element, an output capacitor and a controller. The controller is configured to control an operation of the at least one power switching element to periodically feed an input DC voltage to the energy storage element and the output capacitor to obtain an output DC voltage on the output capacitor. The controller comprises:
a sampling and feedback unit, configured to obtain a first ramp signal reflecting energy variation of the energy storage element; and
a ramp compensation unit, configured to receive the first ramp signal and to produce a second ramp signal,
wherein the second ramp signal is produced based on the first ramp signal, wherein a difference between the second ramp signal and the first ramp signal is lower than a predetermined value, and wherein the controller controls operation of the at least one power switching element based on the difference between the first and second ramp signals.

Optionally, the sampling and feedback unit may comprise a resistor divider circuit and a filter circuit, wherein the resistor divider circuit is coupled to a first end of the energy storage element to obtain a voltage signal at the first end of the energy storage element, and wherein the voltage signal is transmitted through the filter circuit to produce the first ramp signal.

Optionally, the resistive divider circuit may comprise a first resistor and a second resistor that are connected in series, wherein the resistive divider circuit has a first end coupled to the energy storage element and a second end coupled to a ground, and wherein the filter circuit is coupled to a connection node of the first resistor and the second resistor.

Optionally, the ramp compensation unit may comprise a clamping circuit for producing the second ramp signal based on the first ramp signal, wherein in an event of the second ramp signal rising above the first ramp signal, the clamping circuit is configured to cause the second ramp signal to decrease to the first ramp signal.

Optionally, the clamping circuit may comprise:
an operational amplifier configured to receive the first ramp signal and the second ramp signal, and to output a drive signal; and
a first switch connected between the second ramp signal and a ground, wherein when the second ramp signal rises above the first ramp signal, the drive signal drives the first switch to turn on to cause the second ramp signal to decrease, and when the second ramp signal drops to the first ramp signal, the drive signal drives the first switch to turn off to cause the second ramp signal to stop decreasing.

Optionally, the ramp compensation unit may comprise:
a sample-and-hold circuit configured to produce a sampled-and-held signal based on the first ramp signal, wherein the sampled-and-held signal follows the minimum value of the first ramp signal to vary; and
a selection circuit configured to receive and compare the sampled-and-held signal that has been filtered and the first ramp signal, wherein when the sampled-and-held signal is higher than the first ramp signal, the selection circuit causes the second ramp signal to become equal to the first ramp signal, and when the sampled-and-held signal is not higher than the first ramp signal, the selection circuit causes the second ramp signal to become equal to the sampled-and-held signal.

Optionally, the selection circuit may comprise:
a comparator configured to receive the sampled-and-held signal that has been filtered and the first ramp signal, to and output a control signal; and
a second switch connected between the first and second ramp signals,
wherein when the sampled-and-held signal is higher than the first ramp signal, the control signal controls the second switch to turn on to cause the second ramp signal to become equal to the first ramp signal.

In a further aspect, the present invention provides a method for controlling a switched-mode power supply. The switched-mode power supply comprises at least one power switching element and an energy storage element. The one or more power switching elements are switchable to feed an input DC voltage to the energy storage element. The method comprises:
obtaining a first ramp signal based on an energy variation of the energy storage element;
producing a second ramp signal based on the first ramp signal, wherein a difference between the second ramp signal and the first ramp signal is lower than a predetermined value; and
controlling an operation of the at least one switching element based on a difference between the first and second ramp signals.

Optionally, the method may further comprise, in an event of the second ramp signal rising above the first ramp signal, causing the second ramp signal to decrease to the first ramp signal.

The controller of the present invention is used to control a power switching device in a switched-mode power supply to convert an input DC voltage into an output DC voltage. The controller includes a sampling and feedback unit and a ramp compensation unit, and is configured to obtain a first ramp signal reflecting an energy variation of an energy storage element and to produce a second ramp signal from the first ramp signal so that the difference between the second ramp signal and the first ramp signal is lower than a predetermined value. In this way, output DC errors, excessive output voltage variations and other problems due to switching between light and heavy load conditions that may arise from the use of traditional ramp compensation can be adaptively overcome, whilst the advantages of the traditional ramp compensation can be retained, thus resulting in enhanced performance during instantaneous load jumps. Thus, an output capacitor with lower ESR is allowed to be used in the switched-mode power supply. The switched-mode power supply and the method provided in the present invention offer similar advantages.

DETAILED DESCRIPTION

The controller, switched-mode power supply and method proposed in the present invention will be described in greater detail below with reference to particular embodiments and the accompanying drawings. From the following description, advantages and features of the invention will become more apparent. Note that the figures are provided in a very simplified form not necessarily drawn to exact scale and for the only purpose of facilitating easy and clear description of the embodiments.

Figure 1:
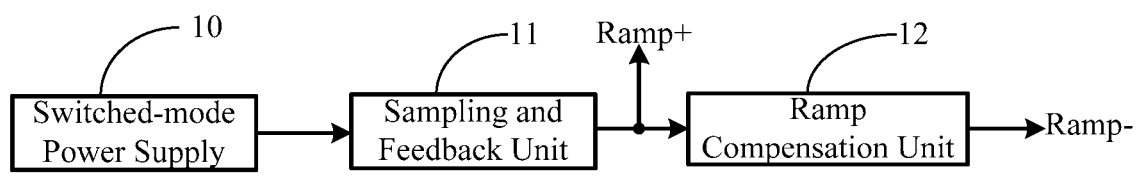
FIG. 1 is a schematic illustration of a controller according to an embodiment of the present invention.
Figure 2:
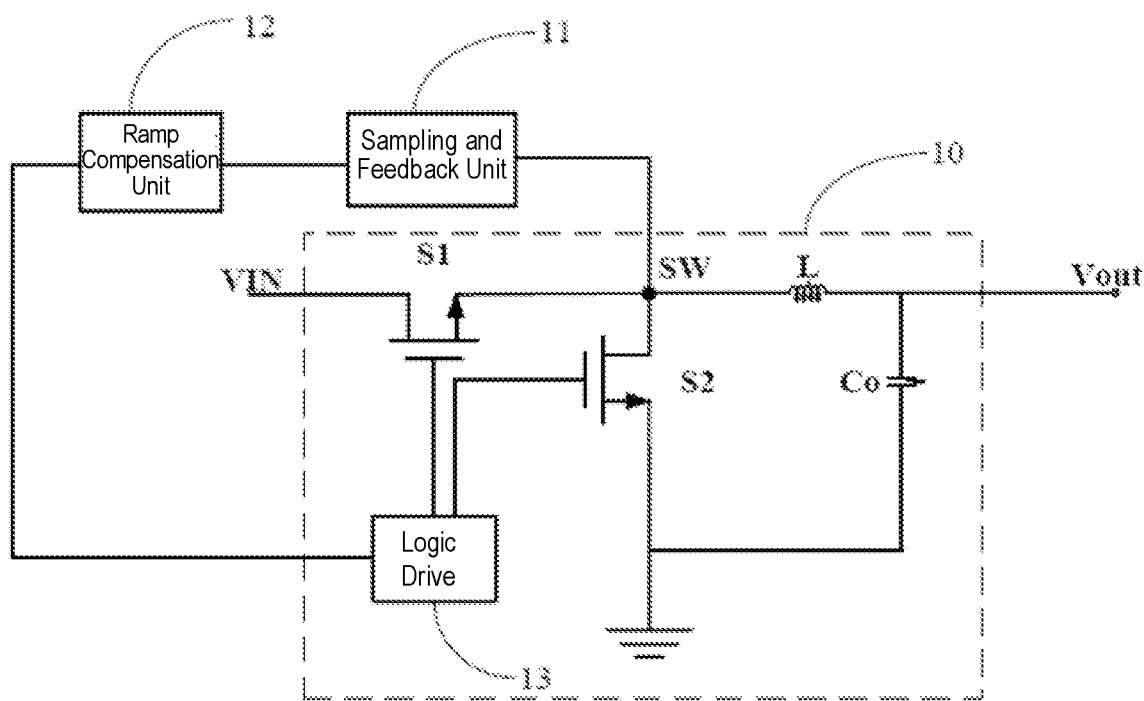
FIG. 2 is a schematic circuit diagram of a switched-mode power supply according to an embodiment of the present invention.

FIG. 1 is a schematic illustration of a controller according to an embodiment of the present invention. FIG. 2 is a schematic circuit diagram of a switched-mode power supply according to an embodiment of the present invention. As shown in FIGS. 1 and 2, the controller includes: a sampling and feedback unit 11 for obtaining a first ramp signal Ramp+ reflecting energy variation of an energy storage element in the switched-mode power supply 10; and a ramp compensation unit for receiving the first ramp signal Ramp+ and producing a second ramp signal Ramp−. As discussed above, the first ramp signal Ramp+ may be a voltage signal collected from a node SW in FIG. 2, which reflects variation of a voltage across an inductor. When the controller is used in another circuit of, for example, a buck-boost, flyback or boost topology, the first ramp signal Ramp+ may also be collected from a different node, as long as it can reflect energy variation of the energy storage element in the circuit in a form of ripple. The second ramp signal Ramp− is derived from the first ramp signal Ramp+, and the difference between the second ramp signal Ramp− and the first ramp signal Ramp+ is lower than a predetermined value. That is, the difference of Ramp− minus Ramp+ is lower than the predetermined value. The predetermined value may be zero, for example. In preferred embodiments, Ramp+ is always higher than or equal to Ramp−. Based on the difference between the first and second ramp signals, the controller controls operation of one or more power switching elements. The one or more power switching elements may be, for example, switches S1 and S2 in a buck circuit shown in FIG. 2. When the controller is used in another circuit of, for example, a buck-boost, flyback or boost topology, the one or more power switching elements may be corresponding switching elements in the circuit.

Figure 3:
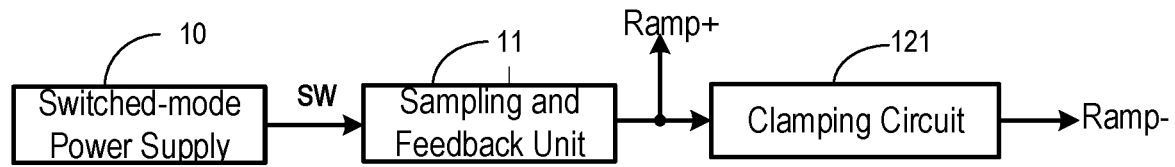
FIG. 3 is a schematic illustration of the controller according to another embodiment of the present invention.
Figure 4:
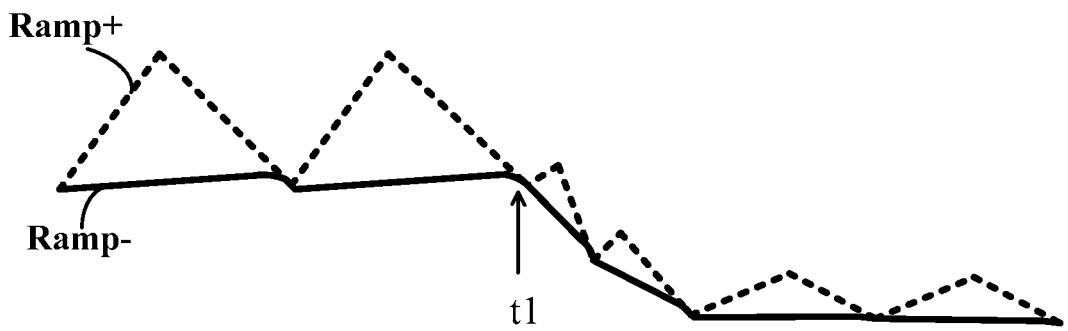
FIG. 4 is a schematic waveform diagram of a compensation voltage according to an embodiment of the present invention.
Figure 5:
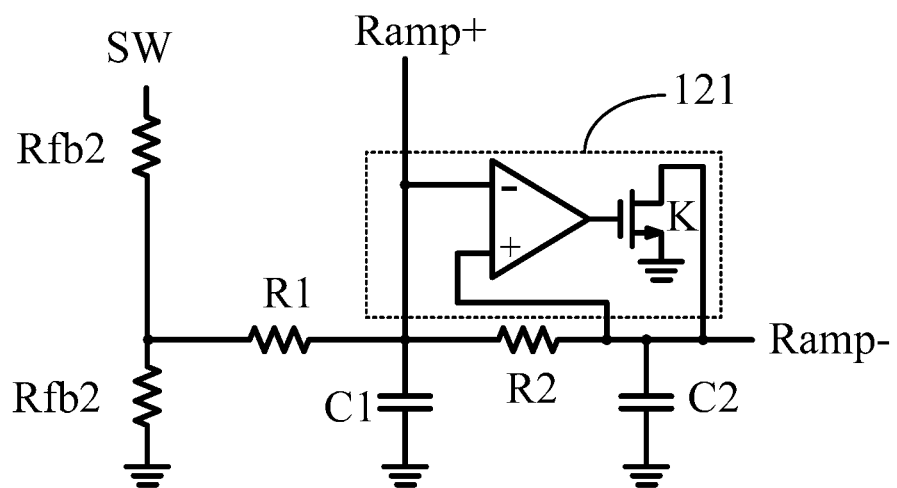
FIG. 5 is a schematic diagram of a particular circuit implementation of the controller according to yet another embodiment of the present invention.

Combined reference is now made to FIG. 3, a schematic illustration of the controller according to an embodiment of the present invention, FIG. 4, a schematic illustration of the first and second ramp signals, and FIG. 5, a schematic illustration of a particular circuit implementation of the controller circuit. As shown in FIG. 3, the ramp compensation unit 12 includes a clamping circuit 121 for producing the second ramp signal Ramp− based on the first ramp signal Ramp+. Specifically, when the second ramp signal Ramp− rises above the first ramp signal Ramp+, the clamping circuit 121 reduces the second ramp signal Ramp− until it equals the first ramp signal Ramp+. In FIG. 4, the dotted line represents the first ramp signal Ramp+, while the solid line represents the second ramp signal Ramp−. The switched-mode power supply 10 operates in a continuous conduction mode (CCM) under a heavy load condition in the first two switching periods and switches to a discontinuous conduction mode (DCM) at t1. In this process, the second ramp signal Ramp− always follows the minimum value of the first ramp signal Ramp+ to vary, thereby ensuring that Ramp+ is always higher than or equal to Ramp−. In this way, a compensation voltage obtained as the difference of Ramp+ minus Ramp− will not experience an abnormal excessive variation due to the load jump. Thus, performance during instantaneous load changes can be enhanced, and the introduction of an excessive variation or a DC offset to the output voltage can be avoided.

In the particular circuit implementation of FIG. 5, the sampling and feedback unit 11 includes a resistor divider circuit and a filter circuit. The resistor divider circuit includes a first resistor Rfb1 and a second resistor Rfb2, which are connected in series with each other. The first resistor Rfb1 is coupled to one end SW of the energy storage element so that a voltage signal at the end of the energy storage element can be obtained from a node at which the first resistor Rfb1 is coupled to the second resistor Rfb2. The voltage signal is transmitted through the filter circuit to produce the first ramp signal Ramp+. The resistor divider circuit and the filter circuit consisting of a resistor R1 and a capacitor C1 are merely examples, and other combinations of voltage sampling circuits, current sampling circuit and filter circuits are also possible without departing from the scope of the invention. The clamping circuit 121 includes an operational amplifier. The first ramp signal Ramp+ is received at a negative input terminal of the operational amplifier, and the second ramp signal Ramp− is received at a positive input terminal of the operational amplifier. The operational amplifier is configured to amplify the difference between the two signals and output a drive signal for controlling a first switch K connected between the second ramp signal Ramp− and the ground. The first switch K can be turned on to pull down Ramp−. When the second ramp signal Ramp− rises above the first ramp signal Ramp+, the operational amplifier will turn on the first switch K by pulling up a gate voltage thereof. As a result, Ramp− starts dropping due to electrical discharge until it becomes lower than Ramp+. At this point, the gate voltage is low. Therefore, the first switch K is turned off, and the second ramp signal Ramp− stops decreasing. During switching between the CCM and DCM, Ramp− can always follow a valley of Ramp+ to vary, ensuring that Ramp+ is always higher than or equal to Ramp−. In this way, the compensation voltage obtained as the difference of Ramp+ minus Ramp− will not experience an abnormal excessive variation due to the load jump. Thus, performance during instantaneous load changes can be optimized, and the introduction of an excessive variation or a DC offset to the output voltage can be avoided. The controller provided in the present invention can adaptively overcome output DC errors, excessive output voltage variations and other problems due to switching between light and heavy load conditions that may arise from the use of traditional ramp compensation while retaining the advantages thereof, thus resulting in enhanced performance during instantaneous load jumps. Thus, an output capacitor with lower ESR is allowed to be used in practical application. This can result in reduction in chip area and cost, and ensure system stability and dynamic performance.

Figure 6:
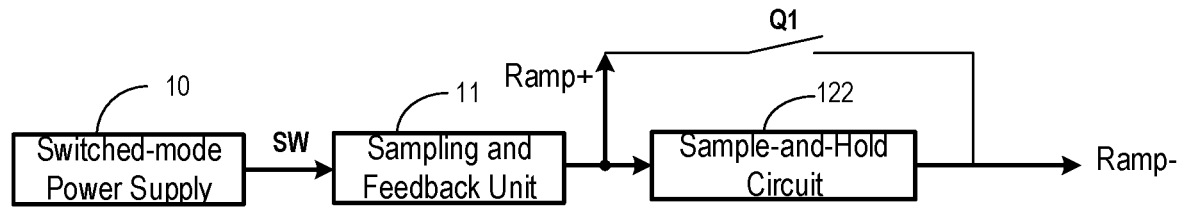
FIG. 6 is a schematic illustration of the controller according to a further embodiment of the present invention.
Figure 7:
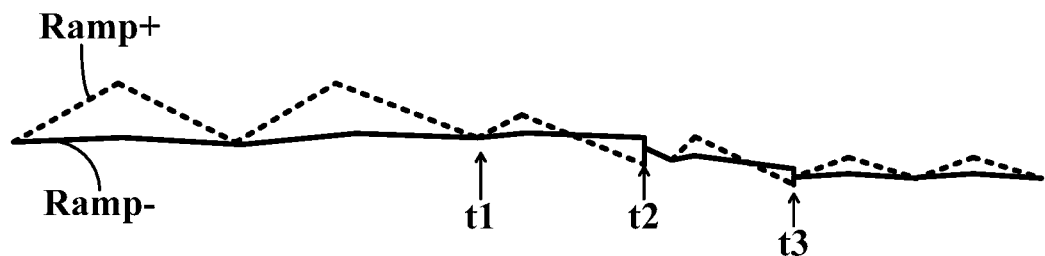
FIG. 7 is a schematic waveform diagram of the compensation voltage according to another embodiment of the present invention.
Figure 8:
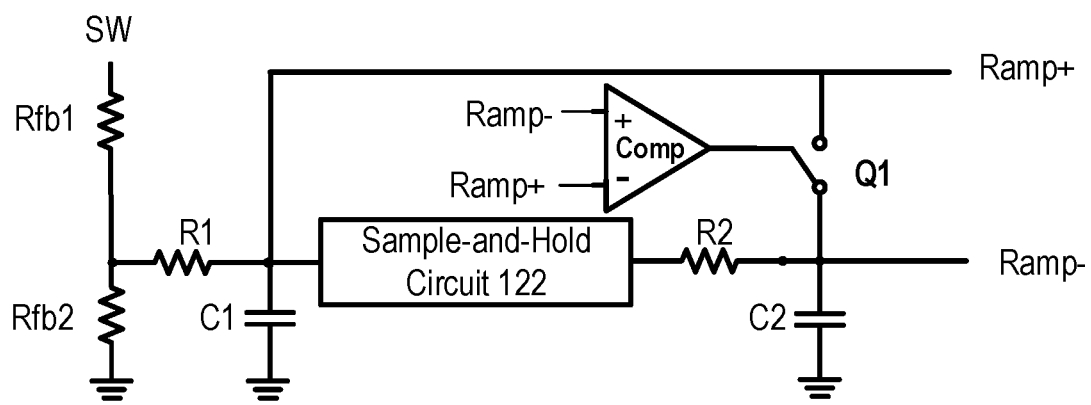
FIG. 8 is a schematic circuit diagram of the controller according to a further embodiment of the present invention.

Combined reference is now made to FIG. 6, a schematic illustration of the controller according to another embodiment of the present invention, FIG. 7, a schematic illustration of the first and second ramp signals, and FIG. 8, a schematic illustration of a particular circuit implementation of the controller circuit. As shown in FIG. 6, the ramp compensation unit 12 includes: a sample-and-hold circuit 122 for producing a sampled-and-held signal from the first ramp signal Ramp+, which follows the minimum value of the first ramp signal to vary; and a selection circuit (a second switch Q1 and branches thereof). Specifically, when the sampled-and-held signal is higher than the first ramp signal Ramp+, the selection circuit causes the second ramp signal to become equal to the first ramp signal. Moreover, when the sampled-and-held signal is not higher than the first ramp signal Ramp+, the selection circuit causes the second ramp signal to become equal to the sampled-and-held signal. In FIG. 7, the dotted line represents the first ramp signal Ramp+, while the solid line represents the second ramp signal Ramp−. The switched-mode power supply 10 operates in a continuous conduction mode (CCM) under a heavy load condition in the first two switching periods and switches at t1 to a discontinuous conduction mode (DCM). Due to a delay in the sample-and-hold circuit, the sampled-and-held signal is higher than the first ramp signal Ramp+ at t2. In response, the selection circuit shorts the second ramp signal Ramp− to Ramp+ and then maintains Ramp− equal to Ramp+ until the next switching period of the triangular waveform starts. The same occurs at t3, and further detailed description is believed unnecessary and omitted herein. The controller always detects the difference between the sampled-and-held signal and Ramp− from to ensure that Ramp+ is not much lower than Ramp−. In some embodiments, exceeding of the first ramp signal Ramp+ by the sampled-and-held signal may be taken as a trigger. In some other embodiments, for accuracy and reliability of the particular circuit implementation, exceeding of the first ramp signal Ramp+ by the sampled-and-held signal and reaching of a predetermined value by the difference between the two signals may be taken as a trigger. This can effectively prevent maloperation. In this embodiment, the controller can ensure that the difference between Ramp+ and Ramp− is not lower than a fixed value. As a result, the compensation voltage obtained as the difference of Ramp+ minus Ramp− will not experience an abnormal excessive variation due to a load jump, and performance during instantaneous load jumps can be optimized. Moreover, the introduction of an excessive variation or a DC offset to the output voltage can be avoided.

For the particular circuit implementation, reference can be made to FIG. 8. The sampling and feedback unit 11 has been discussed above, and further detailed description thereof is believed unnecessary and omitted herein. The resistor divider circuit and the filter circuit consisting of a resistor R1 and a capacitor C1 are merely examples, and other combinations of voltage sampling circuits, current sampling circuit and filter circuits are also possible without departing from the scope of the invention. The selection circuit includes: a comparator Comp for receiving the sampled-and-held signal that has been filtered (e.g., by an optional filter circuit consisting of a resistor R2 and a capacitor C2) and the first ramp signal Ramp+, and for outputting a control signal; and the second switch Q1 connected between the first ramp signal Ramp+ and the second ramp signal Ramp−. When the sampled-and-held signal exceeds the first ramp signal by the predetermined value, the comparator Comp outputs a high level, which turns on the switch Q1 and thereby pulls Ramp+ up to Ramp−. That is, the second ramp signal is made equal to the first ramp signal. As can be seen, during steady-state operation of the switched-mode power supply, the sampled-and-held signal will not exceed the first ramp signal Ramp+, and the second ramp signal Ramp− is provided by the sampled-and-held signal. When the sampled-and-held signal rises above the first ramp signal Ramp+ as a consequence of dynamic response of switched-mode power supply to a load jump, the selection circuit in the controller will cause Ramp+ to become equal to Ramp− until the next switching period of the triangular waveform of the first ramp signal starts. With this controller, the compensation voltage obtained as the difference of Ramp+ minus Ramp− will not experience an abnormal excessive variation due to a load jump, and performance during instantaneous load jumps can be optimized. Moreover, the introduction of an excessive variation or a DC offset to the output voltage can be avoided. The controller of the present invention can adaptively overcome output DC errors, excessive output voltage variations and other problems due to switching between light and heavy load conditions that may arise from the use of traditional ramp compensation while retaining the advantages thereof, thus resulting in enhanced performance during instantaneous load jumps. Thus, an output capacitor with lower ESR is allowed to be used in practical application. This can result in reductions in chip area and cost and ensure system stability and dynamic performance.

The present invention also relates to a switched-mode power supply including one or more power switching elements, an energy storage element, an output capacitor and the controller as discussed above. The controller controls operation of the one or more power switching elements to periodically feed an input DC voltage to the energy storage element and the output capacitor and obtains an output DC voltage on the output capacitor. The controller includes: a sampling and feedback unit for obtaining a first ramp signal reflecting energy variation of the energy storage element; and a ramp compensation unit for receiving the first ramp signal and producing a second ramp signal. The second ramp signal is produced based on the first ramp signal, and the difference between the second and first ramp signals is lower than a predetermined value. The controller controls operation of the one or more power switching elements based on the difference between the first and second ramp signals. The switched-mode power supply may be, for example, the buck circuit shown in FIG. 2. Alternatively, it may be another isolated or non-isolated DC-DC converter. In each case, the controller operates in a similar way, and further detailed description is believed unnecessary and omitted herein.

In the controller, switched-mode power supply and method proposed in embodiments of the present invention, in response to switching of the switched-mode power supply from the CCM to DCM, the ramp compensation circuit maintains the difference between the sampled voltage Ramp+ and Ramp− not lower than a predetermined value. In this way, the compensation voltage fed to the feedback loop will not experience a significant variation. As a result, output DC errors, excessive output voltage variations and other problems due to switching between light and heavy load conditions that may arise from the use of traditional ramp compensation can be adaptively overcome, whilst the advantages of the traditional ramp compensation can be retained, thus resulting in enhanced performance during instantaneous load jumps. Thus, an output capacitor with lower ESR is allowed to be used in practical application. This can result in reductions in chip area and cost and ensure system stability and dynamic performance.

It is to be noted that the embodiments disclosed herein are described in a progressive manner, with the description of each embodiment focusing on its differences from others. Reference can be made between the embodiments for their identical or similar parts.

The foregoing description is merely that of several preferred embodiments of the present invention and is not intended to limit the scope of the claims of the invention in any way. Any person of skill in the art may make various possible variations and changes to the disclosed embodiments in light of the methodologies and teachings disclosed hereinabove, without departing from the spirit and scope of the invention. Accordingly, any and all such simple variations, equivalent alternatives and modifications made to the foregoing embodiments based on the essence of the present invention without departing from the scope of the embodiments are intended to fall within the scope of protection of the invention.

What is claimed is:

1. A controller for a switched-mode power supply, the switched-mode power supply comprising at least one power switching element and an energy storage element, wherein the at least one power switching element is switchable to feed an input DC voltage to the energy storage element, wherein the controller comprises:
   a sampling and feedback unit, configured to obtain a first ramp signal reflecting an energy variation of the energy storage element, wherein the sampling and feedback unit comprises a resistor divider circuit and a filter circuit, wherein the resistor divider circuit is coupled to a first end of the energy storage element to obtain a voltage signal at the first end of the energy storage element, and wherein the voltage signal is transmitted through the filter circuit to produce the first ramp signal; and
   a ramp compensation unit, configured to receive the first ramp signal and to produce a second ramp signal, wherein the second ramp signal is produced based on the first ramp signal, wherein a difference between the second ramp signal and the first ramp signal is lower than a predetermined value, and wherein the controller controls an operation of the at least one power switching element based on the difference between the first and second ramp signals.

2. The controller of claim 1, wherein the resistive divider circuit comprises a first resistor and a second resistor that are connected in series, wherein the resistive divider circuit has a first end coupled to the energy storage element and a second end coupled to a ground, and wherein the filter circuit is coupled to a connection node of the first resistor and the second resistor.

3. The controller of claim 1, wherein the ramp compensation unit comprises:
   a clamping circuit for producing the second ramp signal based on the first ramp signal, wherein in an event of the second ramp signal rising above the first ramp signal, the clamping circuit is configured to cause the second ramp signal to decrease to the first ramp signal.

4. The controller of claim 3, wherein the clamping circuit comprises:
   an operational amplifier configured to receive the first ramp signal and the second ramp signal, and to output a drive signal; and
   a first switch connected between the second ramp signal and a ground, wherein when the second ramp signal rises above the first ramp signal, the drive signal drives the first switch to turn on to cause the second ramp signal to decrease, and when the second ramp signal drops to the first ramp signal, the drive signal drives the first switch to turn off to cause the second ramp signal to stop decreasing.

5. The controller of claim 1, wherein the ramp compensation unit comprises:
   a sample-and-hold circuit configured to produce a sampled-and-held signal based on the first ramp signal, wherein the sampled-and-held signal follows a minimum value of the first ramp signal to vary; and
   a selection circuit configured to receive and compare the sampled-and-held signal that has been filtered and the first ramp signal, wherein when the sampled-and-held signal is higher than the first ramp signal, the selection circuit causes the second ramp signal to become equal to the first ramp signal, and when the sampled-and-held signal is not higher than the first ramp signal, the selection circuit causes the second ramp signal to become equal to the sampled-and-held signal.

6. The controller of claim 5, wherein the selection circuit comprises:
   a comparator configured to receive the sampled-and-held signal that has been filtered and the first ramp signal and to output a control signal; and
   a second switch connected between the first and second ramp signals,
   wherein when the sampled-and-held signal is higher than the first ramp signal, the control signal controls the second switch to turn on so as to cause the second ramp signal to become equal to the first ramp signal.

7. A switched-mode power supply comprising at least one power switching element, an energy storage element, an output capacitor and a controller, wherein the controller is configured to control an operation of the at least one power switching element to periodically feed an input DC voltage to the energy storage element and the output capacitor to obtain an output DC voltage on the output capacitor, wherein the controller comprises:
   a sampling and feedback unit, configured to obtain a first ramp signal reflecting energy variation of the energy storage element, wherein the sampling and feedback unit comprises a resistor divider circuit and a filter circuit, wherein the resistor divider circuit is coupled to a first end of the energy storage element to obtain a voltage signal at the first end of the energy storage element, and wherein the voltage signal is transmitted through the filter circuit to produce the first ramp signal; and
   a ramp compensation unit, configured to receive the first ramp signal and to produce a second ramp signal, wherein the second ramp signal is produced based on the first ramp signal, wherein a difference between the second ramp signal and the first ramp signal is lower than a predetermined value, and wherein the controller controls an operation of the at least one power switching element based on the difference between the first and second ramp signals.

8. The switched-mode power supply of claim 7, wherein the resistive divider circuit comprises a first resistor and a second resistor that are connected in series, wherein the resistive divider circuit has a first end coupled to the energy storage element and a second end coupled to a ground, and wherein the filter circuit is coupled to a connection node of the first resistor and the second resistor.

9. The switched-mode power supply of claim 7, wherein the ramp compensation unit comprises a clamping circuit for producing the second ramp signal based on the first ramp signal, wherein in an event of the second ramp signal rising above the first ramp signal, the clamping circuit is configured to cause the second ramp signal to decrease to the first ramp signal.

10. The switched-mode power supply of claim 9, wherein the clamping circuit comprises:
   an operational amplifier configured to receive the first ramp signal and the second ramp signal, and to output a drive signal; and
   a first switch connected between the second ramp signal and a ground, wherein when the second ramp signal rises above the first ramp signal, the drive signal drives the first switch to turn on to cause the second ramp signal to decrease, and when the second ramp signal drops to the first ramp signal, the drive signal drives the first switch to turn off to cause the second ramp signal to stop decreasing.

11. The switched-mode power supply of claim 7, wherein the ramp compensation unit comprises:
   a sample-and-hold circuit configured to produce a sampled-and-held signal based on the first ramp signal, wherein the sampled-and-held signal follows a minimum value of the first ramp signal to vary; and
   a selection circuit configured to receive and compare the sampled-and-held signal that has been filtered and the first ramp signal, wherein when the sampled-and-held signal is higher than the first ramp signal, the selection circuit causes the second ramp signal to become equal to the first ramp signal, and when the sampled-and-held signal is not higher than the first ramp signal, the selection circuit causes the second ramp signal to become equal to the sampled-and-held signal.

12. The switched-mode power supply of claim 11, wherein the selection circuit comprises:
   a comparator configured to receive the sampled-and-held signal that has been filtered and the first ramp signal, and to output a control signal; and
   a second switch connected between the first and second ramp signals,
   wherein when the sampled-and-held signal is higher than the first ramp signal, the control signal controls the second switch to turn on to cause the second ramp signal to become equal to the first ramp signal.

13. A method for controlling a switched-mode power supply, the switched-mode power supply comprising at least one power switching element and an energy storage element, wherein the at least one power switching element is switchable to feed an input DC voltage to the energy storage element, wherein the method comprises:
   obtaining a first ramp signal based on an energy variation of the energy storage element;
   producing a second ramp signal based on the first ramp signal, wherein a difference between the second ramp signal and the first ramp signal is lower than a predetermined value; and
   controlling an operation of the at least one power switching element based on a difference between the first and second ramp signals, and
   wherein the method further comprises: in an event of the second ramp signal rising above the first ramp signal, causing the second ramp signal to decrease to the first ramp signal.

* * * * *